United States Patent Office 3,057,414
Patented Oct. 9, 1962

3,057,414
AGRICULTURAL IMPLEMENT WITH THREE-POINT HITCH AND GUIDE LINK
Harold A. Ralston, Rockford, Ill., assignor to J. I. Case Company, Racine, Wis., a corporation of Wisconsin
Filed Dec. 30, 1960, Ser. No. 79,718
6 Claims. (Cl. 172—444)

The present invention relates to agricultural implements and particularly the type intended to be mounted on tractors, and an object is to generally improve the construction and operation of devices of this class.

It is well known to mount implements of various types at the rear of tractors on hitches comprising a plurality of links. In such cases, at least two of the links extend rearwardly from the tractor and are connected at spaced points on the implement, the several elements being pivoted together; and the tractor, the links, and the implement forming together an irregular figure which may distort by swinging of the links on the tractor as the implement "floats" in traversing the usual irregularities of the ground, or is adjusted by other means for depth of operation. By properly positioning the parts, the implement may be made to swing, for example, up and down, with reasonable accuracy about an imaginary or virtual hitch point forwardly on the tractor, and this possibility may be utilized to cause the implement to work efficiently in finding its own depth of operation, maintaining it, etc. However, such arrangements involve certain inherent difficulties. Substantially, all implements are arranged so that they can be lifted clear of the ground for transport or when not in use, but such lifting commonly causes a pronounced tilting of the implement in a forward direction. Such tilting is objectionable if the implement happens to involve seed cans, in that it is difficult to load the cans from the rear of the tractor (the only feasible position) when they are sharply tilted away from the operator, and also, when the cans are full there is danger of spilling substantial quantities of seed when the implement is raised. Furthermore, if the implement involves gauge wheels spaced in front of the implement frame, as commonly done in the usual "tool bar" type of implement, these wheels will approach a position in the transverse vertical plane of the aforesaid virtual hitch point which position would be in an unfavorable relation to the path of movement of the implement as it is raised. Consequently, when the implement is raised, the gauge wheels are not raised enough to clear obstructions while the implement is in transport position. Furthermore, an implement which tilts sharply forward as it is raised is apt to conflict with objects fastened to the tractor or with rearwardly projecting parts of the tractor.

Consequently, a further object of the invention is to provide an implement mounted on a tractor and operable relatively to a virtual hitch point in operating range, but having a modified path of movement while being raised to transport position.

Another object is to provide such an implement which will avoid excessive forward tilting while being raised from operating to transport position.

Another object is to provide such an implement, which, when equipped with a forwardly displaced gauge wheel, will raise the gauge wheel to a satisfactory height when the implement is raised; such an implement, which when equipped with seed cans will be convenient to load when in raised position; and such an implement which will avoid interference with mechanism or objects normally projecting rearwardly on the tractor.

The constructions utilized for the realization of the above objects are illustrated in the accompanying drawings in which FIG. 1 is a right side elevation of an implement typical of those contemplated, mounted on a tractor, parts of the tractor and implement being broken away to show what lies beyond.

FIG. 3 is a detail of an assembly seen in FIG. 1, in substantially horizontal axial section with parts removed and others broken away.

Figure 1:
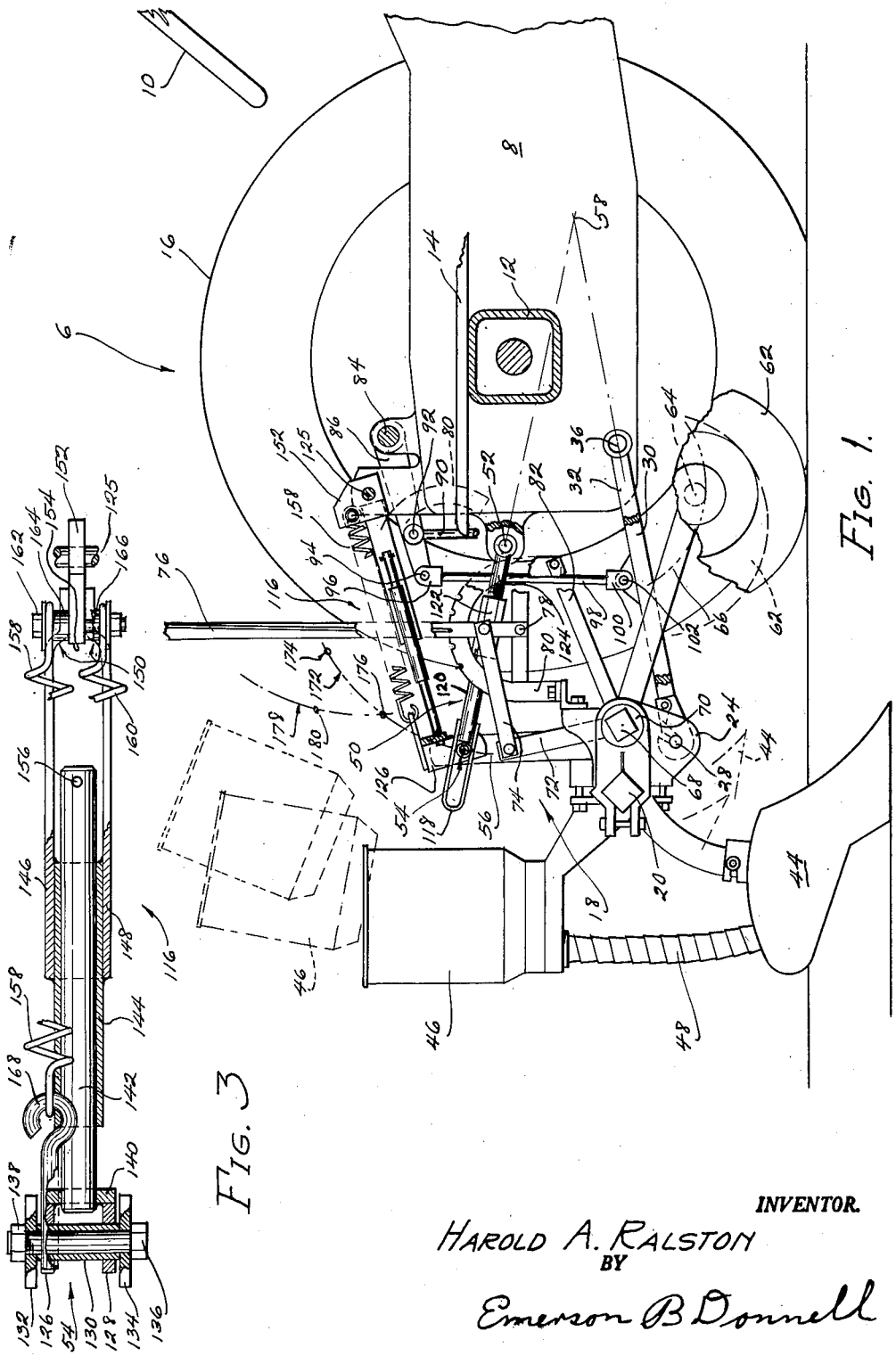

Similar reference characters have been applied to the same or identical parts wherever they occur in the specification, and in the various figures of the drawings, it being understood that the latter are intended as illustrative merely, and that the invention is not to be taken as limited by the showing in the drawings, or in fact in any manner except as defined in the claims.

As seen in FIG. 1, the assemblage including the invention is shown as attached to a tractor generally designated as 6, having a transmission section 8, a steering wheel 10, a rear axle housing 12, a step plate 14, and a traction wheel 16, it being understood that the tractor has numerous other well-known parts, many of which have been omitted to avoid unnecessary complication, and since they do not involve any part of the invention.

Figure 2:
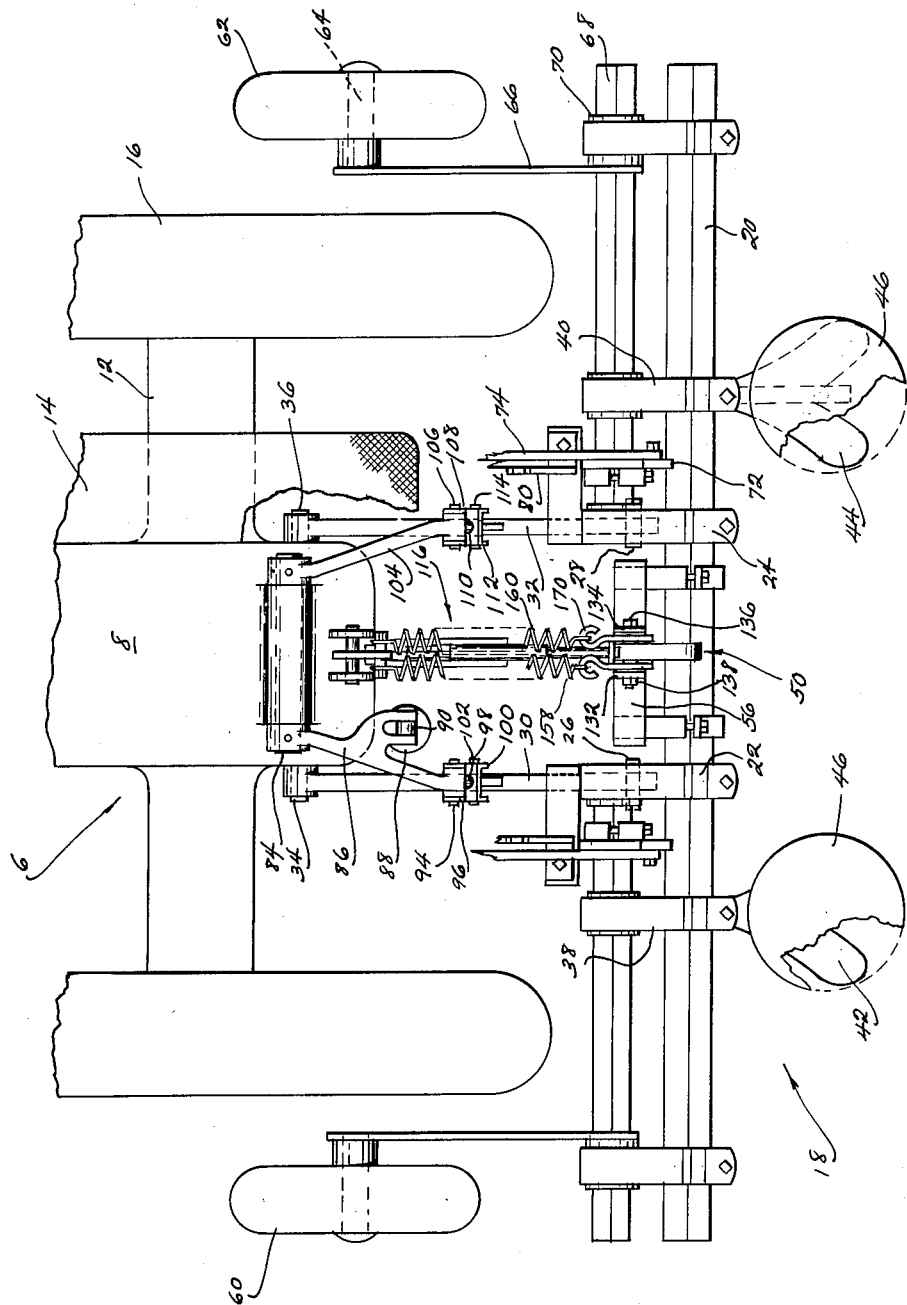
FIG. 2 is a plan view of the same with parts broken away and others removed.

The implement, typical of a variety of implements which may involve or benefit from the invention, is generally designated as 18, FIGS. 1 and 2, and includes what is generally known as a tool bar 20 having clamped thereto bearing, clamp or pivot portions 22 and 24, spaced apart laterally of the central vertical plane of the tractor and provided with pivots or pins 26 and 28 to which are connected in well-known manner lower links or draft bars 30 and 32. Draft bars 30 and 32 are pivotally attached to the tractor by means of pins 34 and 36 and serve both to propel or draw implement 18 and to lift the same from time to time, as will be described.

Also fastened to tool bar 20, by means of clamps 38 and 40, are earth-working tools 42 and 44, in the present instance, lister bottoms, although it is to be understood that other ground-working elements of various types may be substituted within the contemplation of the invention, and furthermore, that while only two lister bottoms are shown, more may be used within the capacity of the tractor.

As is common, each lister bottom in the present illustrative embodiment, is equipped with a seed dispensing unit or can 46, actuated to feed seeds through the usual flexible tubes, as 48 to the soil as it is opened by bottoms 42 and 44. The mechanism for dispensing the seed, and its driving means may be of any conventional or well-known type, not necessary to show or describe.

The assemblage so far described would, of course, be unstable, the forward pull on lower links 30 and 32, in cooperation with the rearward force of the ground resistance on bottoms 42 and 44, causing a strong rotating force or couple, clockwise as seen in FIG. 1, about pivots 26 and 28. This force is resisted by an upper link, generally designated as 50, pivoted to the tractor on a pin 52 and engaging a pin or pivot 54 fixed on a mast portion 56. Mast portion 56 is rigidly connected with above-mentioned tool bar 20 and constitutes therewith an implement frame. Upper link 50 is therefore placed under compression by the aforesaid tendency of the implement or mast 56 to rotate forwardly or toward the tractor, and the implement as a whole is thereby stabilized in desired relation to the tractor.

The mechanism, so far described, is characteristic of the well known three-point hitch, the implement behaving when in operation, approximately as if it were pivoted to the tractor at an imaginary or virtual hitch point removed forwardly of the actual hitch points 36 and 52 and defined by the intersection of the plane of lower links 30 and 32 with the center line of link 50 extended, this point being designated by numeral 58.

Bottoms 42 and 44 in the particular implement disclosed would be caused, by the weight of the parts and by the natural "suck," or tendency of the ground to force them downwardly, to dig or run deeper than desired, and the actual working depth is controlled by a pair of gauge wheels 60 and 62 which roll along the ground and support the frame constituted by tool bar 20 and mast 56 at any desired selected height above the ground. The adjustment of the gauge wheels may be controlled from the tractor.

Gauge wheel 62 is journaled on an axle 64 fixed rigidly with an arm 66 which is fixed in any suitable manner in relation to a rockshaft 68 journaled in a bearing 70 clamped or otherwise fixed to tool bar 20. Rockshaft 68 extends generally in the same direction as tool bar 20, has a bearing in above-mentioned clamp 24, and in the vicinity of said clamp 24, has an upwardly extending arm 72 connected through a link 74 with a lever 76 pivoted at 78 on a quadrant structure 80 fixed in any suitable manner in relation to bearing 70 and clamp 24. Quadrant structure 80 is further supported by a brace 82 fixed in well-known manner with any suitable part on the implement frame. As will now be apparent, forward movement of lever 76 will rock arm 72 in a clockwise direction, as seen in FIG. 1, and cause relative downward displacement of gauge wheel 62, by reason of rocking of rockshaft 68 and arm 66. Inasmuch as gauge wheel 62 is already resting on the ground, such motion will cause upward movement of tool bar 68 with appropriate swinging of links 30, 32, and 50, about their respective pivots on the tractor. The effect will be, therefore, to cause bottom 44 to run at any desired depth selected by positioning lever 76 and latching it to quadrant 80 in the usual manner. A preferably identical arrangement is provided on the left side of implement 18 to control gauge wheel 60, and which will not need to be further described.

While it may appear, particularly in the following description, that implement 18 is rigidly mounted on the tractor insofar as sideward rocking is concerned, as a practical matter, structures of this nature are inherently flexible or "springy," and it is necessary to support both sides (or ends) of tool bar 20 in substantially the same manner, in order to insure even depth of operation of the implements along the length of the tool bar.

Devices of this nature are commonly arranged to be lifted clear of the ground for transport purposes by means of the power of the tractor, and in this illustrative embodiment the tractor provides a power lift rockshaft 84 journaled on transmission portion 8 and having an arm 86 fixed thereto. Arm 86 is swung, for example upwardly, by means of a power cylinder 88 mounted on the tractor and supplied with fluid from the tractor power lift system, in well-known manner not necessary to illustrate, and which raises a piston rod portion 90, pivoted to arm 86 on a pin 92. Arm 86 is pivoted by means of a pin 94 to a clevis 96 connected by means of a pull rod 98 to a clevis 100, in turn connected by a pin 102 to above-mentioned lower link 30. Upward movement of piston rod 90 will accordingly cause upward rocking of lower link 30. Similar action occurs in the case of lower link 32. Shaft 84, has fixed therewith an arm 104 connected by a pin 106 with a clevis 108, in turn connected through a pull rod 110 with a clevis 112 pivoted by means of a pin 114 to lower link 32. Rocking of arm 86 and shaft 84 accordingly causes similar or identical rocking of arm 104 and link 32, as will be apparent.

As common in linkages of this nature, the substantial upward movement caused by the lifting mechanism causes a forward tilting or rotation of the implement as a whole, as if swinging about above-mentioned imaginary point 58, particularly since point 58 tends to shift backwardly to an appreciable extent during such movement, and which is objectionable for several reasons; first, owing to the rather complicated array of frame member, shafts, links, etc., parts of the implement may be so positioned as to interfere with parts of the tractor. As a specific example in the embodiment shown, quadrant 80 would contact step plate 14 at about the time or shortly after bottom 44 was raised to the surface of the ground. Any further movement such as necessary to give ground clearance, would be blocked by contact between these parts.

Furthermore, such forward tilting would place seed cans 46 in an extremely awkward position for filling, as seen in dotted lines in FIG. 1, and might even cause spilling of seed if the cans were well filled.

Another difficulty caused by the tilting arises from the relation between gauge wheels 60 and 62 and virtual hitch point 58. As shown, gauge wheel 62 is very much closer to the transverse vertical plane of point 58 than is the major portion of implement 18, specifically bottom 44. Consequently, as bottom 44 is lifted, wheel 62 being substantially as much below as to the rear of point 58, will be lifted an unsatisfactory amount and largely shifted merely backwardly along the ground, especially in view of the aforesaid backward movement of point 58. Therefore, gauge wheel 62 and its companion 60 will not be sufficiently clear of the ground and will interfere with proper transport of the implement. To remedy these difficulties, a mast guide link, generally designated as 116, is incorporated in the combination, and which modifies the lifting movement in such a manner as to alleviate these difficulties.

Link 50, to accommodate the action of mast guide link 116, has an eye or strap portion 118 in which above-mentioned pivot 54 is slidably engaged to provide a pin-and-slot connection at this point so that link 50 is in effect an extensible link. Mast 56 and its attached parts, being biassed when in operation as aforesaid to swing forwardly about pivots 26 and 28, pivot 54 will tend to remain in the forward end of the slot or eye defined by strap 118. Strap 118 is fixed to a portion 120 threaded into a turnbuckle 122 forming part of upper link 50, and a portion 124, also threaded into turnbuckle 122 and pivoted on above-mentioned pin 52 completes link 50.

Mast guide link 116 is telescopic or collapsible in character and connected between above-mentioned pivot 54 and a pivot 125 fixed on the tractor in any suitable manner, above and in the present instance forwardly of pin 52. It comprises a pair of spaced plates 126 and 128 journaled on a sleeve or spacer 130 (FIG. 3), clamped between upward directed ears 132 and 134 forming part of the above-mentioned mast 56. A bolt 136 extends through sleeve 130 and has a nut 138 for clamping the parts rigidly together, sleeve 130 and bolt 136 forming above-mentioned pivot 54.

A rod 142 is fixed to plate 140 above pivot 54, and extends generally forwardly, in a direction substantially normal to pivot 54. Rod 142 is slidable in a sleeve 144 which is fixed to spaced strap or side members 146 and 148 which extend generally in the direction of rod 142 and sleeve 144, and which in the present instance converge at 150 and are fixed to a pivot plate 152 journaled on above-mentioned pivot 125.

In the position of the parts shown in FIG. 1, rod 142 clears plate 152, but may contact an abutment surface 154 when link 116 is telescoped. A pin 156 prevents inadvertent removal of rod 142 from sleeve 144.

Link 116 is retracted as far as permitted by link 50 by a pair of springs 158 and 160, anchored between plates 126 and 128 respectively, and a bolt 162 extending through plate 152 above straps 146 and 148, the springs being spaced from plate 152 by tubular spacers 164 and 166. Plate 126 has a hook 168 fixed thereto above plate 140 to which spring 158 is connected, and, similarly, plate 128 has a hook 170 (FIG. 2) to which spring 160 is connected.

Springs 158 and 160 are powerful enough to keep mast 56 in the forwardmost position permitted by links 50 and 116 substantially at all times, and pivot 54 is therefore compelled to follow a path defined by link 50 in its upward movement from the position shown in FIG. 1, until such path is modified by the action of link 116, as will be described.

During operation, for small up-and-down adjustments of implement 18 the latter swings substantially about abovementioned virtual hitch point 58, and pivot 54, being held against the forward end of eye 118 by springs 158 and 160, travels in the path defined by arc 172 about pin 52 as a center. This motion continues during raising of the implement from the FIG. 1 position, either by adjustment of gauge wheels 60 and 62 or the action of powerlift 88, until bottom 44 has reached the surface of the ground whereupon the motion is modified as will appear.

In prior constructions pivot 54 would continue to follow arc 172 during subsequent lifting movement to an extreme position indicated as 174, necessary for bottom 44 to clear the ground. Such movement in said prior constructions would place implement 18 in a sharply forwardly tilted position, as indicated by the dotted line positions of seed can 46, bottom 44 and gauge wheel 62. It is to be noted also that quadrant 80 will interfere with step plate 14. Note also that gauge wheel 62 is lifted only about half as far as bottom 44.

These difficulties are alleviated by the action of link 116.

As pivot 54 moves upwardly along arc 172, rod 142 is shifted axially through sleeve 144 until it encounters abutment 154, thus shortening or telescoping link 116. At this point pivot 54 will have reached the position indicated by numeral 176. Link 116 can no longer telescope, and becomes a rigid compression link extending between pivot 54 and pivot 125. Pivot 54 during further movement is therefore prevented from continuing along arc 172, and constrained to move along a new arc 178 about pivot 125 as a center. This movement is permitted by sliding of pivot 54 in eye 118, link 50 being ineffective during travel of pivot 54 along arc 178, and may continue to an extreme position indicated at 180.

In this position seed can 46 will take the location indicated in dot-dash lines, as will also, the gauge wheel 62 and lister bottom 44. As will be apparent, gauge wheel 62 is lifted much higher than in prior arrangements by reason of the action of link 116, while seed can 46 is substantially vertical, as compared with the dotted position characteristic of prior constructions. Furthermore, there is no conflict between quadrant 80 and step plate 14.

The dot-dash position of seed can 46 will clearly be much more convenient for filling and much less prone to spillage of seed than the prior dotted position.

The operation of the device is thought to be clear from the above, it being apparent that the novel interaction between the two links 50 and 116, which swing about spaced centers on the tractor, provides a new path of movement of the upper portion of mast 56, and accordingly a new path of movement of the implement as a whole, which will accomplish the objects of the invention.

The above being a complete description of an illustrative embodiment of the invention, what is claimed as new and desired to be secured by Letters Patent of the United States is:

1. In a tractor mounted implement of the type disposed at the rear of the tractor and having a frame portion and a
   virtual hitch point forwardly on the tractor, the combination of an implement frame including an upwardly directed
   mast portion rigid with said frame portion, a rearwardly directed
   lower link pivoted to the tractor and to said implement frame, an upwardly and rearwardly directed
   upper link pivoted to the tractor at a point above the connection of said lower link to the tractor, and to said implement frame at a point spaced upwardly from the point of attachment of said lower link to said frame, said upper link being constituted to provide for shifting of said implement frame in the direction of the length of said upper link, and a rearwardly directed
   mast guide link pivoted to the tractor above the point of attachment of said upper link to said tractor, said mast guide link being extensible and collapsible, and disposed in rearwardly converging relation to said upper link,
   means limiting the collapsing movement of said mast guide link, and
   means continuously urging said mast guide link in the direction toward said limiting means.

2. In a tractor mounted implement of the type disposed at the rear of the tractor and having a frame portion and a
   virtual hitch point forwardly on the tractor, the combination of an implement frame including an upwardly directed mast portion rigid with said frame portion, said implement having, when in working position, a rearwardly and downwardly directed
   lower link pivoted to the tractor and to said implement frame, an upwardly and rearwardly directed
   upper link pivoted to the tractor at a point above the connection of said lower link to the tractor, and to said implement frame at a point spaced upwardly from the point of attachment of said lower link to said frame, said upper link being constituted to provide for shifting of said implement frame in the direction of the length of said upper link, a rearwardly and downwardly directed
   mast guide link pivoted to the tractor above and forwardly of the point of attachment of said upper link to said tractor, said mast guide link being extensible and collapsible,
   means limiting the collapsing movement of said mast guide link, and
   means continuously urging said mast guide link in the direction toward said limiting means.

3. In a tractor mounted implement of the type disposed at the rear of the tractor and having a frame portion and a
   virtual hitch point forwardly on the tractor, the combination of an implement frame including an upwardly directed
   mast portion rigid with said frame portion, said implement having, when in working position, a pair of transversely spaced rearwardly and downwardly directed
   lower links pivoted to the tractor and to said implement frame, an upwardly and rearwardly directed
   upper link pivoted to the tractor at a point above the connection of said lower links to the tractor, and to said implement frame at a point spaced upwardly from the point of attachment of said lower links to said frame, said upper link being constituted to provide for shifting of said implement frame in the direction of the length of said upper link, a rearwardly and downwardly directed
   mast guide link pivoted to the tractor above and forwardly of the point of attachment of said upper link to said tractor, said mast guide link being extensible and collapsible,
   means limiting the collapsing movement of said mast guide link, and
   means continuously urging said mast guide link in the direction toward said limiting means.

4. In a tractor implement hitch of the type including a rearwardly directed
   lower link pivoted to the tractor and to the implement, an upwardly directed
   mast portion rigid with the implement, an upwardly and rearwardly directed upper link pivoted to the tractor and to said mast portion, and means for raising said implement whereby said mast portion will tend to swing toward the tractor and tilt said implement forwardly, the combination of means providing lost motion in the direction of the length of said upper link, and abutment means interposed between said mast and the tractor, and positioned to limit the extent to which said mast may swing toward the tractor, and accordingly the amount which said implement may tilt forwardly.

5. In a tractor implement hitch of the type including a rearwardly directed lower link pivoted to the tractor and to the implement, an upwardly directed mast portion rigid with the implement, an upwardly and rearwardly directed upper link pivoted to the tractor and to said mast portion, and means for raising said implement whereby said mast portion will tend to swing toward said tractor and tilt said implement forwardly, the combination of means providing lost motion in the direction of the length of said upper link, an abutment means interposed between said mast and the tractor, and positioned to limit the extent to which said mast may swing toward the tractor, and accordingly the amount which said implement may tilt forwardly, and means continuously urging said mast portion in the direction toward said abutment.

6. In a tractor implement hitch of the type including a rearwardly directed lower link pivoted to the tractor and to the implement and an upwardly directed mast portion rigid with the implement, the combination of an upwardly and rearwardly directed extensible upper link pivoted to the tractor and to said mast and positioned to guide said mast portion in an upward and forward path, a rearwardly directed expansible and retractable mast guide link pivoted to the tractor and to said mast and positioned to guide said mast portion in an upward and rearward path, the interaction of said upper link and said mast guide link defining a modified path of movement of said mast as compared with the path defined by either of said upper and said mast guide links.

References Cited in the file of this patent
UNITED STATES PATENTS 2,782,703  Chambers _____ Feb. 26, 1957

FOREIGN PATENTS 143,089  Australia _____ Aug. 28, 1951